Figure 1:
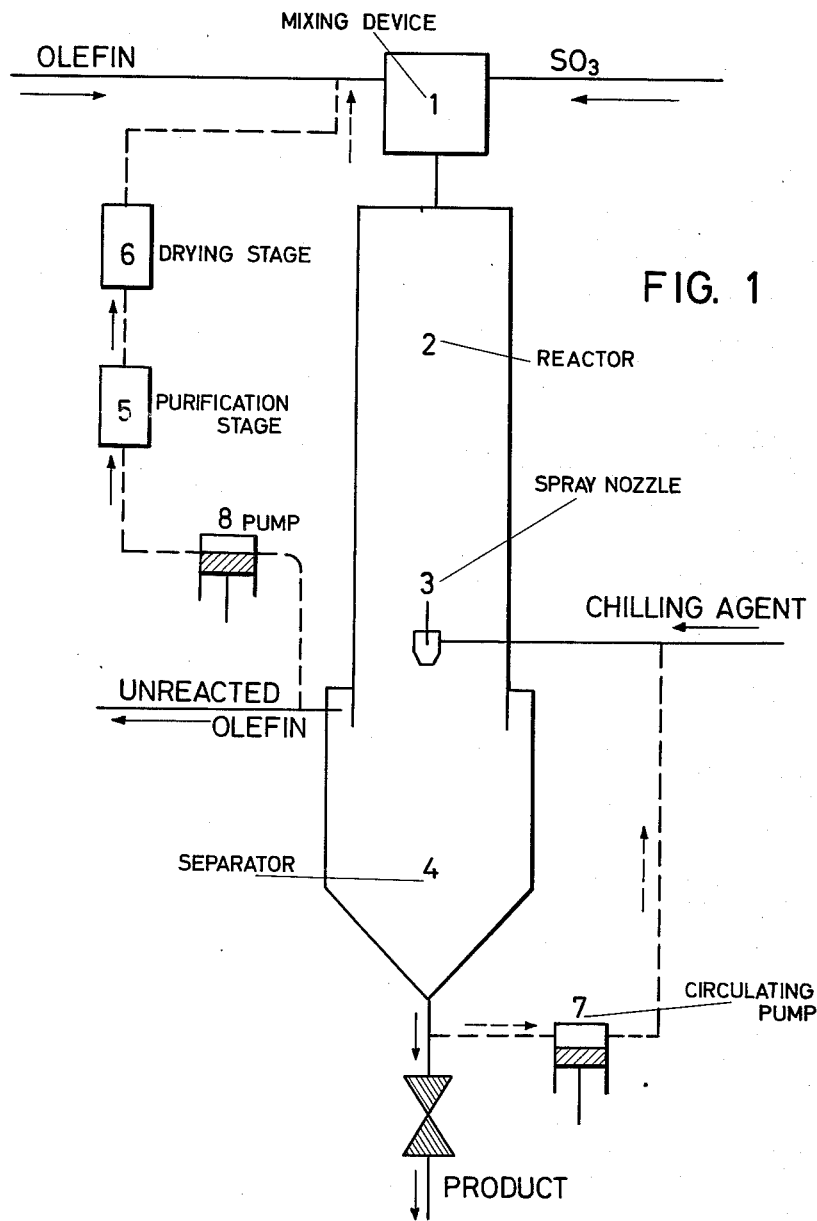

June 7, 1966  A. WOLFRAM ET AL  3,255,240
PROCESS FOR PREPARING β-HYDROXY-ALKANE-ɑ-SULFONIC
ANHYDRIDES AND HYDROLYSIS PRODUCTS THEREOF
Filed June 23, 1965  2 Sheets-Sheet 1

INVENTORS
ARTHUR WOLFRAM
HERBERT KALTENHÄUSER
BY
Curtis, Morris & Safford
ATTORNEYS

INVENTORS
ARTHUR WOLFRAM
HERBERT KALTENHÄUSER

# United States Patent Office 3,255,240
Patented June 7, 1966

3,255,240
PROCESS FOR PREPARING β-HYDROXY-ALKANE-α-SULFONIC ANHYDRIDES AND HYDROLYSIS PRODUCTS THEREOF
Arthur Wolfram and Herbert Kaltenhäuser, Frankfurt am Main, Germany, assignors to Farbwerke Hoechst Aktiengesellschaft vormals Meister Lucius & Brüning, Frankfurt am Main, Germany, a corporation of Germany
Filed June 23, 1965, Ser. No. 466,407
Claims priority, application Germany, Dec. 9, 1960, F 32,728
10 Claims. (Cl. 260—503)

This application is a continuation-in-part of our co-pending application Serial No. 157,215 filed December 5, 1961. The present invention relates to a process for preparing β-hydroxy-alkane-α-sulfonic anhydrides and their secondary products.

It is known that olefins can be reacted with sulfur trioxide. The reaction between one molecule of olefin and two molecules of $SO_3$ proceeds especially smoothly. Thus, for example, it is known that carbyl sulfate is obtainable from one molecule of ethylene and two molecules of sulfur trioxide by the reaction:

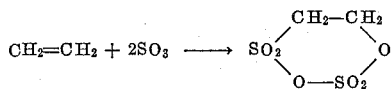

In the same manner higher olefins can be reacted with sulfur trioxide in a molar ratio of 1:2 to yield compounds which are designated herein as "carbyl sulfates."

It is much more difficult to react olefins with sulfur trioxide in a molar ratio of 1:1. In this case 1,2-sultones are formed which have the structural element

and can be considered anhydrides of β-hydroxy-alkane-α-sulfonic acids. Up to now it was considered possible to react only very few olefins in this manner. It is known, for example, that styrene, hexene, and other liquid olefins can be transformed into the corresponding 1,2-sultones in liquid phase with the aid of the addition complex compound formed from equimolar amounts of dioxane and sulfur trioxide. Still further, it has been suggested to transform gaseous and liquid perfluorinated or substantially fluorinated alkenes with the aid of polymeric α-sulfur trioxide into the corresponding fluorinated 1,2-sultones. The preparation of 1,2-sultones by this process from the simplest but industrially most important olefins, for example, ethylene and propylene, have not yet been described.

In addition, dimeric 1,2-sultones, the so-called sulfonylides, are known. These can also be considered β-hydroxy-alkane-α-sulfonic anhydrides, because in water they form β-hydroxy-alkane-α-sulfonic acids as do the monomeric 1,2-sultones. The syntheses of said sulfonylides has been described only in purely scientific articles as resulting in the isolation of only traces of sulfonylides. Higher molecular weight compounds that are composed of alternating olefin and sulfur trioxide molecules and which can be considered as polymeric β-hydroxy-alkane-α-sulfonic anhydrides have not yet been disclosed.

Nor has a method been proposed heretofore for preparing 1,2-sultones on an industrial scale. The use of the above-mentioned addition complex compound of dioxane and sulfur trioxide for this purpose appeared to be uneconomical. Even if the said complex compound could be employed in a larger field of the application, the use of dioxane would render the industrial application uneconomical since dioxane and especially its continuous regeneration and drying are rather complicated and expensive. Moreover, the 1,2-sultones can be only prepared in a very narrow temperature range because of the fact that the said complex is not stable.

The present invention provides an industrial and generally applicable process for the manufacture of β-hydroxy-alkane-α-sulfonic anhydrides and their secondary products from olefins and sulfur trioxide, which comprises intimately mixing an olefin of the formula

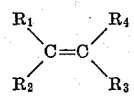

in which $R_1$, $R_2$, $R_3$ and $R_4$ stand for hydrogen or hydrocarbon radicals, with predominately monomolecular sulfur trioxide in such relative proportions that the molecular concentration of $SO_3$ in the resulting reaction mixture is at most 10%, and maintaining said reaction mixture in a reaction zone, whereby β-hydroxy-alkane-α-sulfonic anhydrides are obtained having

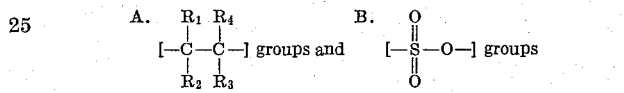

in which the numerical ratio of groups B to A is from 1:1 to less than 2:1. The term "sulfur trioxide," as used in this application, is intended to refer to pure sulfur trioxide diluted with or dissolved in fluid that is inert to or non-reactive with sulfur trioxide, monoolefins or their reaction products, and to exclude compounds or sulfur trioxide.

For the preparation of secondary products the β-hydroxy-alkane-α-sulfonic anhydrides obtained can be reacted with polar or polarizable compounds to yield β-substituted α-sulfonic acids, α,β-unsaturated sulfonic acids or salts of these acids. The term "β-hydroxy-alkane-α-sulfonic acid" is intended to include β-hydroxy-cycloalkane-sulfonic acids.

Monoolefins are preferred as olefin reactants in the process of the invention. Polyolefins which are free from conjugated or cumulated double bonds can also be used. The olefins that are particularly useful are those having 2 to 20 carbon atoms, such as ethylene, propylene, butene-1, butene-2, hexenes, isooctene, undecylene, octadecylene and the like. Furthermore, cycloalkenes the isocyclic ring of which preferably contains 5 or 6 carbons atoms, such as cyclopentene, methylcyclopentene, cyclohexene, methylcyclohexenes, ethylcyclohexenes and the like can also be used. Generally, olefins containing only carbon and hydrogen atoms are preferred. The hydrocarbons mentioned above may, however, contain substituents that are inert under the reaction conditions, such as, for example, aryl radicals, chlorine atoms, nitro groups, cyano groups or alkoxy groups of 1 to 6 carbon atoms. Examples of these compounds are styrene, chlorohexene, oleic acid nitrile and vinyl-ethyl ether. Mixtures of said olefins may be also used, for example crude mixtures of olefinically unsaturated hydrocarbons. The olefin reactant can be reacted with sulfur trioxide to a product which contains the two compounds in a proportion of approximately 1:1, while the formation of the corresponding carbyl sulfate is substantially or completely avoided, by using sulfur trioxide in predominantly, and preferably in exclusively, monomolecular form and reacting it with the olefin in such a manner that the molar concentration of sulfur trioxide in the reaction mixture is at most 10% and preferably at most 3.3 to 0.5%, i.e., the molar ratio of olefin to $SO_3$ is at least 9:1 and is preferably between about 30:1 and 200:1. Then the mixture flows through a reaction zone wherein the reaction takes place. Finally, the mixture containing the desired end-product leaves the reaction zone and passes a zone the temperature of which is lower than the reaction temperature.

A preferred method for maintaining sulfur trioxide in monomolecular form is mixing it very rapidly with the olefin, preferably in less than 0.2 second. When, under otherwise identical conditions, the mixing time is reduced to less than 0.01 second, the proportion of "carbyl sulfate" in the product formed is distinctly reduced while the proportion of β-hydroxy-alkane-α-sulfonic anhydride is increased. These short mixing times may be obtained by use of known mixing devices.

Sulfur trioxide in monomolecular form can likewise be obtained or the formation thereof can be favored by operating at sufficiently elevated temperatures, preferably in the gaseous phase, by diluting the gaseous sulfur trioxide with gases that are inert to sulfur trioxide or by working in a solvent at a higher dilution ratio, for example at least 1:10.

When the sulfur trioxide and the olefin have been intimately mixed with one another in the absence of a solvent and ethylene is used as an olefin, the residence time in the reaction zone has to be at least 5 seconds. When, in this case, olefins having three or more carbon atoms are used, shorter residence times are generally sufficient but they are usually not less than about one second. However, if the olefin is of relatively high molecular weight, residence times can be shorter than one second. When the sulfur trioxide and the olefin have not been intimately mixed with one another but the monomolecular form of the sulfur trioxide is caused by dilution of the sulfur trioxide, the residence time required for complete reaction depends, of course, on the reaction temperature. In the reaction of ethylene in that case the residence time is preferably 20 seconds or more, but it is generally shorter in the reaction of higher olefins, for example 1 to 20 seconds.

The formation of by-products depends on the moisture content of the reactants and solvent, if any. The amount of by-products formed is smaller with lower moisture content. The formation of a product containing olefin and sulfur trioxide in a ratio of 1:1 is favored by increasing the temperature, the excess of olefin and the concentration of olefin (or partial pressure of olefin), shortening the mixing time and extending the reaction time after complete mixing. It is not possible, however, to increase the temperatures and reaction times at will, since at too high a temperature and with long residence times the olefin can be oxidized by sulfur trioxide to a large extent to form undesired by-products. When ethylene is reacted with sulfur trioxide in the gaseous phase at 200° C. and with a reaction time of two minutes, disturbing amounts of by-products are already formed. The limit is distinctly lower in the reaction of other olefins, for example, propylene.

The reaction need not be carried out with pure olefins. The olefins can be diluted with substances which, under the reaction conditions, do not react or react only slowly with sulfur trioxide. The sulfur trioxide, too, can be used in diluted form. Suitable diluents are all substances that are inert towards olefins and sulfur trioxide and in which the sulfur trioxide is not transformed into dimolecular or polymolecular forms. Preferred diluents include nitrogen, hydrogen, carbon dioxide, sulfur dioxide, saturated aliphatic hydrocarbons and the halogen derivatives thereof.

Lower olefins, i.e., olefins having at most 6 carbon atoms, are preferably reacted in the gaseous phase. It is of advantage to use 30–200 mols and preferably 60–100 mols of olefin per mol of sulfur trioxide. The reaction can be carried out at atmospheric pressure. Higher pressures are preferred, however, because they favor the formation of the desired products and make it possible to carry out the reaction in smaller apparatus. A pressure of 4 to 10 atmospheres gauge has proved to be especially advantageous.

When the olefin is reacted in the gaseous phase, it is necessary to operate at a temperature above 50° C. in order to insure that sulfur trioxide be present in monomeric form. When ethylene is reacted in the gaseous phase, a temperature above 80° C. should be employed to yield products in which the proportion of sulfur trioxide to ethylene is distinctly smaller than 2:1. It is of advantage to carry out this reaction at a temperature in the range of 110° C. to 200° C. and with a residence time of 20 seconds to 10 minutes. When higher olefins are reacted with sulfur trioxide the reaction times required are shorter, for example, as low as about one second, and the reaction temperatures are also lower.

The reaction can also be carried out in the liquid phase or in a manner such that sulfur trioxide, dissolved in an inert liquid, is introduced in finely divided form into the gaseous olefin by means of a suitable device.

When reacted with water, the products obtained produce the corresponding β-hydroxy-alkane-α-sulfonic acids in yields of over 80% and often 95–98%. In the hydrolysis of a product in which the proportion of sulfur trioxide to olefin is greater than 1:1, the stoichiometric excess of sulfur trioxide is converted into sulfuric acid. For example, a product of the composition $$(C_2H_4)_{1.0}(SO_3)_{1.13}$$

yields in the hydrolysis 0.95 to 1 mol of β-hydroxy-ethane-α-sulfonic acid and 0.13 mol of sulfuric acid and a product of the composition $(C_3H_6)_{1.0}(SO_3)_{1.25}$ yields 0.90–0.95 mol of β-methyl-β-hydroxy-ethane-α-sulfonic acid and 0.25 mol of sulfuric acid.

When reacted with aqueous alkali hydroxide, for example sodium hydroxide, the β-hydroxy-alkane-α-sulfonic anhydride is transformed directly into the alkali salt of the corresponding α,β-unsaturated sulfonic acid.

The products obtained by the process of the invention can be reacted with pyridine. When, for example, the compound $(C_2H_4)_{1.0}(SO_3)_{1.20}$ is reacted with dry pyridine there is formed the betaine of β-pyridinium-ethane-α-sulfonic acid (melting point of the pure compound 248° C.) in an amount such that after recrystallization from dimethyl formamide the yield amounts to 75% calculated on the ethylene content of the starting compound.

The products obtainable by the process of the invention may also be characterized by the general formula $$(\text{olefin})_n(SO_3)_m$$

wherein $n$ is a whole number preferably not greater than 100, and $m$ is a whole number which is equal to or greater than $n$ and smaller than $2n$.

The index $n$ indicates that the products formed are mixtures of different molecule sizes. Determinations of the medium molecular weights of these mixtures have shown that the most of the β-hydroxy-alkane-α-sulfonic anhydrides formed are oligomers containing 2 to 4 molecules of olefin. The products obtained are probably mixtures of substances of different molecule sizes having a linear structure:

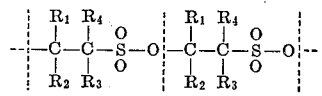

In the presence of traces of water the terminal groups of the chains are formed by the elements of water:

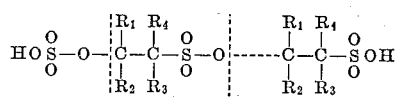

All these substances have the properties of β-hydroxy-alkane-α-sulfonic anhydrides, that is to say they can be quantitatively transformed with water into the corresponding β-hydroxy-alkane-α-sulfonic acids, and, therefore, they can be considered, like 1,2-sultones, as anhydrides of β-hydroxy-alkane-α-sulfonic acids. The hydrolysis is preferably carried out with 0.5 to 3 times the amount by weight of boiling or almost boiling water.

On account of the fact that the products of the process of the invention, contrary to carbyl sulfates, do not form in the hydrolysis equivalent amounts of sulfuric acid as undesired by-products, they are especially valuable for the preparation of β-hydroxy-alkane-α-sulfonic acids and the derivatives thereof. Upon hydrolysis or ammonolysis, carbyl sulfates react according to the equations:

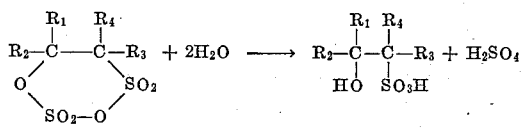

or

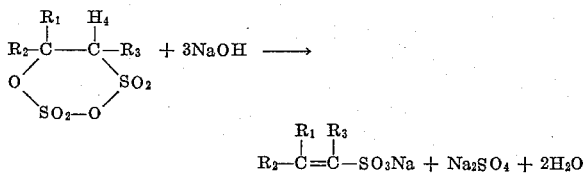

or

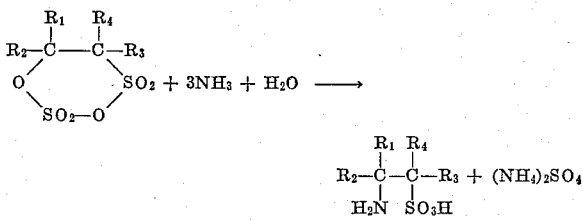

with the formation of equivalent amounts of sulfuric acid or sulfate. In most cases these by-products must be separated if the products formed are to be further processed, this being always associated with considerable expense and often with loss of substance. When the products of the process of the invention are subjected to hydrolysis or ammonolysis, by-products are formed to a much smaller extent, in most cases only fractions as compared with the amounts of by-products formed in the reaction of carbyl sulfates. When $m$ differs only little from $n$, the products yield practically no sulfuric acid or sulfate upon hydrolysis or ammonolysis.

The anhydrides obtained by the process of the invention can be reacted not only with water, alkali metal hydroxide or ammonia, but also with many other substances. Most reactions can be illustrated by the following general equation:

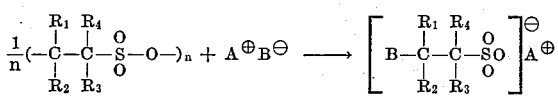

wherein $A^\oplus B^\ominus$ represents a polar or polarizable compound. The following reactions are mentioned by way of example:

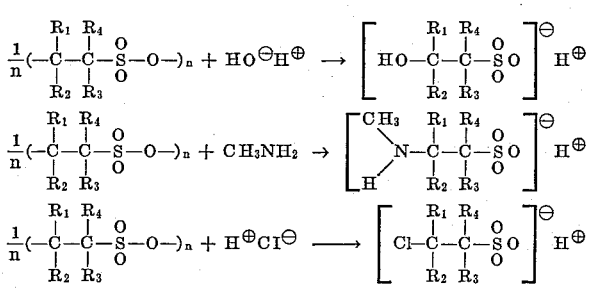

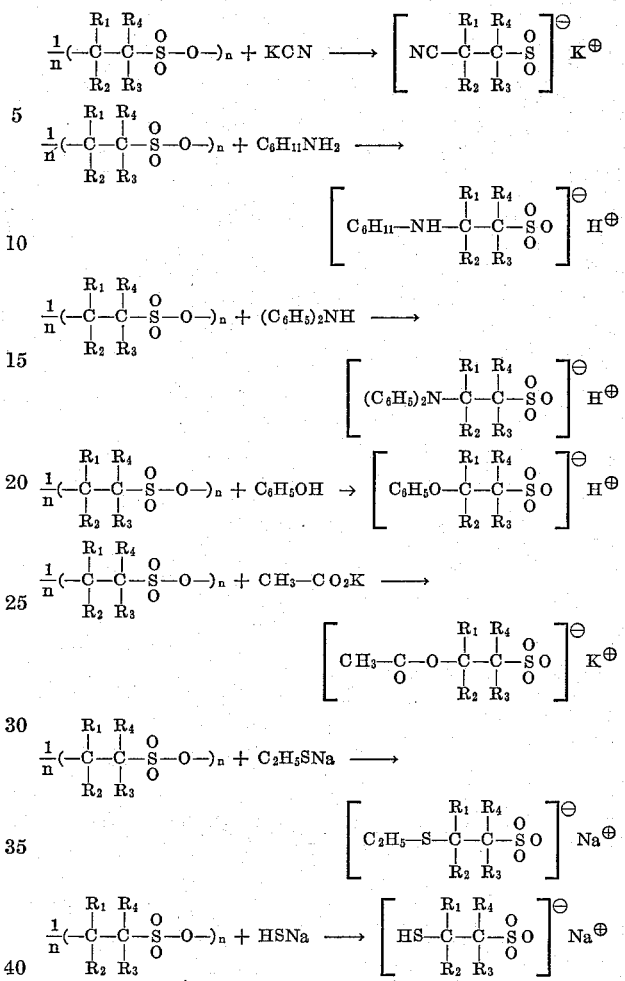

These illustrate merely a few of the many reactions that are possible. The β-hydroxy-alkane-α-sulfonic anhydrides of the invention can, therefore, be used for the manufacture of a great number of β-substituted α-sulfonic acids and their salts.

β-hydroxy-alkane-α-sulfonic anhydrides having at least one hydrogen atom at the carbon atom can be transformed, under the action of alkalies, into the corresponding vinylsulfonic acids, for example, according to the equation:

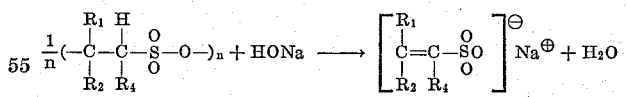

Instead of NaOH, any other strong base or substance which forms a strong base with water can be used.

For preparing β-substituted α-sulfonic acids or the α,β-unsaturated α-sulfonic acids, it is not absolutely necessary to isolate the β-hydroxy-alkane-α-sulfonic anhydrides. The formed β-hydroxy-alkane-α-sulfonic anhydride can be taken up at once in the reagent with which it is to be reacted, so that the secondary product can be obtained directly, if desired with aftertreatment of the solution formed.

The products obtained by the process of the invention in which $n$ is greater than 2 or which can be represented by the inequation $n < m < 2n$ are novel.

The β-hydroxy-alkane-α-sulfonic anhydrides are valuable intermediates for the manufacture of β-hydroxy-alkane-α-sulfonic acids and the derivatives thereof which can be used as washing agents, washing auxiliaries, detergents, or starting components for the manufacture of dyestuffs.

The secondary products are, furthermore, suitable for producing a good adhesion of other substances on fibers, metal surfaces or metal oxide surfaces. The anhydrides of higher olefins can be used as hydrophobizing agents for fibers and surfaces of base metals.

Figure 2:
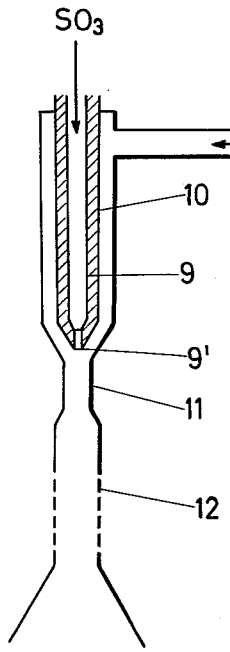
Figure 3:
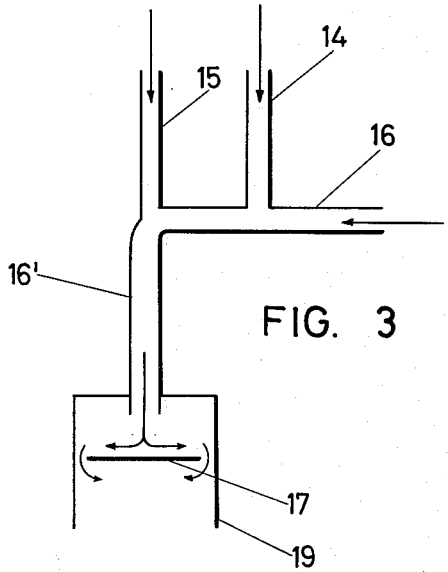
Figure 4:
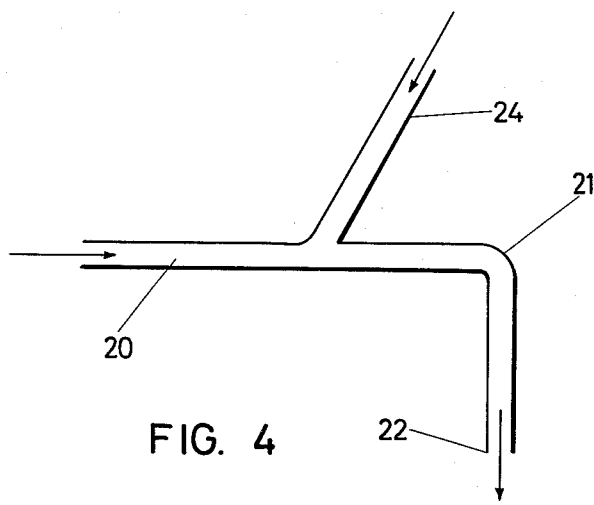

The invention and various features thereof are illustrated diagrammatically in the accompanying drawing, wherein: FIGURE 1 shows a schematic apparatus and flow diagram for the process of the invention; and FIGURES 2 to 4 illustrate various known mixing devices useful in the process for initiating reaction between a gaseous olefin reactant and gaseous sulfur trioxide.

More specifically, FIGURE 1 diagrammatically represents by way of example a device which is suitable for the preparation of secondary products of $\beta$-hydroxy-alkane-$\alpha$-sulfonic anhydrides. In a mixing device 1 the olefin reactant is mixed with vaporous and substantially monomolecular sulfur trioxide in the desired ratio. The mixture flows from above into a reactor 2 which extends into a separator 4 where the reaction product is separated in solid or liquid form. A chilling liquid can be introduced by way of a spraying nozzle 3. As chilling liquid, it is preferable to use an inert or non-reactive substance or a reagent which is needed in the secondary reaction. If a reagent is used and if the temperature is suitably adjusted in the separator, the reagent can already react with the $\beta$-hydroxy-$\alpha$-sulfonic anhydride during the chilling operation to yield a secondary product. The secondary reaction may also be carried out in a separate stage. The solution or suspension obtained after the injection of a chilling reagent is separated in separator 4 from unreacted olefin. The olefin can be reconducted by means of pump 8 into the mixing device, if desired after having passed through a purification stage 5 and a drying stage 6. The product obtained in separator 4 can be discharged and obtained as such or reconducted to nozzle 3 by means of circulating pump 7. In this manner the reactive starting components can be completely reacted or the reaction product can be obtained in a sufficient concentration. It is likewise possible to react the product, prior to reconducting it, so as to obtain the desired final product and then reconduct it, or the desired final product can be separated from the reaction product and only the unreacted chilling agent is reconducted to the nozzle. Still further, it may be of advantage to withdraw a fraction of the circulating chilling agent after it has left the separator and to supply the corresponding amount of fresh chilling agent.

When ethylene and sulfur trioxide are used as starting components for making $\beta$-hydroxy-ethane-$\alpha$-sulfonic anhydride in a device as described above, the corresponding $\beta$-hydroxy-ethane-$\alpha$-sulfonic acid can be obtained directly with water as chilling agent and reagent, the sodium salt of vinyl sulfonic acid is obtainable with sodium hydroxide solution of 20% strength, and the N-cyclohexyltaurine (ammonium salt) is obtainable with cyclohexyl amine.

Mixing devices for carrying out the reaction between olefin and sulfur trioxide in the gas phase include known types that have proved to be suitable for the generation of hot short flames or in the chlorination of gaseous hydrocarbons with gaseous chlorine.

FIGURE 2 represents a concentric mixing nozzle on the principle of a welding burner having an inner conduit 9, an outer conduit 10, a venturi 11 and a mixing zone 12. With a nozzle opening 9' having a diameter of 0.3 mm., the venturi 11 having a diameter of 5 mm., and the mixing zone 12 having a diameter of 8 mm. and a length of 120 mm., the admixture of about 2.0 m.³/hour at normal temperature and pressure gaseous olefin and about 1 mol/hour of sulfur trioxide (as vapor) resulted in flow velocities of about 100 m./sec. through bore 9'; about 30 m./sec. through venturi 11; and about 12 m./sec. through mixing zone 12. A calculation shows that the residence time of the gas mixture in the mixing zone 12 was about 0.01 second.

FIGURE 3 represents a mixing device having two inlet tubes 14 and 15 at right angles to a main inlet tube 16 and a deflecting plate 17.

The mixing device of FIGURE 3 was operated under the following conditions, all gas volumes being expressed as measured at normal temperature and pressure (NTP):

(1) 150 liters/hour of gaseous olefin at a temperature of +120° C. were introduced at a velocity of flow about 19 m./sec. through tube 16, which had an internal diameter of 2.0 mm.

(2) 380 liters/hour of nitrogen +20 liters/hour of sulfur trioxide vapor at a temperature of +120° C. were introduced at a velocity of flow about 33 m./sec. through tube 14, which had an internal diameter of 2.5 mm.

(3) 50 liters/hour of gaseous olefin at a temperature of +120° C. were introduced at a velocity of flow about 11 m./sec. through tube 15, which had an internal diameter of 1.5 mm. and was spaced 10 mm. from tube 14.

(4) The resulting olefin/sulfur trioxide/nitrogen mixture was passed through portion 16' of tube 16, said portion having an internal diameter of 3.0 mm. and a length of 60 mm., at a velocity of flow about 34 m./sec. and was impinged upon deflecting plate 17 having a diameter of 12 mm. and discharged from an exit nozzle 19 having an internal diameter of 16 mm. The residence time of the mixture from the junction of tubes 14 and 16 to the point of discharge from the mixing device was about 0.002 second.

FIGURE 4 represents a known mixing device suitable for chlorinating hydrocarbons. It consists essentially of a tube 20 having a diameter of 2 mm. and a right angle bend 21 about 30 mm. from its exit end 22 and a secondary tube 24 of about the same diameter intersecting tube 20 at an angle of about 50° and at a distance of about 25 mm. from right angle 21. With these dimensions, about 100 liters/hour (NTP) of nitrogen and about 7 liters/hour of vaporous sulfur trioxide in the form of a mixture were introduced into and through tube 20, and about 400 liters/hour (NTP) of gaseous olefin were introduced through the secondary tube 24. The time required by the gases to travel from the point of mixing to the exit 22 was calculated to be about 0.001 second.

The following examples serve to illustrate the invention but they are not intended to limit it thereto.

*Example 1*

(A) Ethylene and vaporous sulfur trioxide were mixed in a flow reactor at atmospheric pressure and at 170° C. with a mixing device according to FIGURE 2 which allowed for mixing the sulfur trioxide with the ethylene in less than 0.01 second in a volume ratio of 100:1. After a residence time of 3 minutes a product was obtained which had the composition $(C_2H_4)_{1.0}(SO_3)_{1.24}$. When hydrolized the said product yielded 0.26 mol of sulfuric acid per mol of $\beta$-hydroxy-ethane-$\alpha$-sulfonic acid.

(B) The experiment described in Part A was repeated under a pressure of 8 atmospheres gauge and with a ratio of ethylene to sulfur trioxide of 65:1. The residence time amounted to 2 minutes at 160° C. A product was obtained consisting of $(C_2H_4)_{1.0}(SO_3)_{1.14}$.

*Example 2*

In a device as illustrated in FIGURE 1 of the accompanying drawing ethylene and sulfur trioxide were reacted under 8 atmospheres gauge and at 160° C. in a proportion of 63:1 while using a mixing device as illustrated in FIGURE 2 of the accompanying drawing which ensured a mixing period of less than 0.01 second. The residence time in reactor 2 amounted to 2 minutes at 160° C. Sodium hydroxide solution of 20% strength by weight of 35° C. was injected through nozzle 3 at the outlet of the reaction tube and the hydroxide solution containing the reaction product and accumulating in separator 4 was reconducted by means of circulating pump 7. The experiment was continued until the sodium hydroxide solution was neutralized. The sodium hydroxide solution contained 19.6 weight percent of sodium vinylsulfonate and 4 weight percent of sodium sulfate.

*Example 3*

100 cc. of liquid dry sulfur dioxide were vigorously gassed while stirring at −40° C. with dry ethylene. While continuously stirring and gasing, a 30% solution of sulfur trioxide in sulfur dioxide was slowly dropped in at a rate such that the temperature did not exceed −30° C. (reactor cooled with Dry Ice). The sulfur trioxide reacted at once. Altogether, 68 grams sulfur trioxide were reacted. The addition of sulfur trioxide being terminated, stirring was continued for a further 30 minutes under the action of ethylene. The sulfur dioxide was evaporated, first at atmospheric pressure and then under reduced pressure and 95.3 grams of a residue were isolated in which the molecular proportion of ethylene to sulfur trioxide was 1:1.18.

*Example 4*

(A) A mixing device as shown in FIGURE 2 and having the following dimensions was used: diameter nozzle 9′=0.8 mm., diameter of venturi 11=about 8 mm., diameter of mixing zone 12=about 12 mm. Through conduit 9 2.67 kg./hour of vaporized sulfur trioxide were passed and 42 m.³/hour (NTP) of ethylene (52.5 kg./hour) were passed through olefin conduit 10. This corresponded to a molar proportion ethylene/sulfuric trioxide 56.2:1. The sulfur trioxide vapor had been preheated to +180° C. and the ethylene had an average temperature of +165° C. After having left the mixing device, the gas current was conducted through a funnel-shaped tube having a length of one meter, into a vertical reaction tube having a length of about 3.5 meters and an internal diameter of 15 cm. which was maintained at +165° C. by means of steam heating. This tube was in turn connected with a tube having a length of one meter, a diameter of 30 cm. cooled externally with water. At the end of said tube three deflecting plates were provided for the collection thereon of the product formed and its separation from the gas current. The arrangement was operated under a pressure of 8-atmosphere gauge. At this pressure the residence time of the gases containing the reaction products in the heated reaction tube was about 30 seconds. The reactants were mixed in the mixing device within a residence time considerably shorter than 0.2 second. When the experiment was terminated the reaction product was mechanically removed from the deflecting plates. The product of the last deflecting plate was analyzed and found to contain, in terms of percent by weight: C=18.1%, H=3.7%, S=30.7%, O=47.5%. This corresponds to the formula $$C_{2.00}H_{4.92}S_{1.28}O_{3.96}$$

in which the ratio of S:O was 1:3.09. The molecular weight of the product, determined cryoscopically in dimethylsulfoxide, was found to be 250 to 256.

(B) *Reaction with water to β-hydroxyethane-α-sulfonic acid (barium salt).*

7.715 grams of the crude product were boiled for four hours with about 100 milliliters of water in an open beaker. Barium hydroxide was added to the aqueous solution obtained until the solution showed a strongly alkaline reaction, and then carbon dioxide was introduced until the solution was neutral. The precipitated mixture of barium sulfate and barium carbonate was filtered off, the aqueous solution was evaporated to dryness and the salt obtained was completely dried at 100° C. under reduced pressure. 11.0 grams of barium-β-hydroxyethane-sulfonate were obtained. Equivalent weight calculated 193.7; equivalent weight found 191.5.

(C) *Reaction with ethyl amine to β-ethylamino-ethane-α-sulfonic acid.*

393 grams of product from Part A and 785 grams of ethylamine were heated for two hours at 180° C. in an autoclave, whereby a pressure of 20 atmospheres gauge was obtained. When the experiment was terminated the reaction product was quantitatively washed out of the autoclave with water, nitrogen was blown through the warm solution to remove the unreacted ethylamine, the cations were removed by an ion exchanger and the solution now containing free acids was analyzed by potentiometric titration. The analysis revealed that 2.12 mols of β-ethylamino-ethane-α-sulfonic acid (N-ethyltaurine), melting point 183° C., had been obtained.

*Example 5*

(A) The mixing device illustrated in FIGURE 2, in which the nozzle 9′ had a diameter of 0.3 mm. the venturi 11 had a diameter of 5 mm., and the mixing zone 12 had a diameter of 16 mm. and a length of 120 mm. was used to mix 1.3 m.³/hour (NTP) of pure propylene having a temperature of about +60° C. and 153 g./hour of sulfur trioxide vapor having a temperature of +65° C. in a fraction of a second. The molar proportion of propylene to sulfur trioxide amounted to 30.6:1. The mixing device was mounted on a vertical reaction tube having a length of two meters and a diameter of 50 mm. The tube was maintained at a temperature of +65° C. Under the aforesaid conditions the residence time of the gas in the tube was about 9 seconds. The gas current containing the reaction product in the form of mist was passed into a flask connected at the lower end of the tube and laterally deflected into an electrostatic dust separator. When the experiment was terminated the yellow-brown reaction product was collected from the electrodes of the dust separator.

Under the specified conditions the temperature in mixing tube 12 was in the range of from +88° C. to +89° C.

Upon analysis the product was found, on the average, to contain in terms of percent by weight: 28.05% C.; 4.95% H; 27.1% S; 39.9% O. The calculated molecular ratios were:

C:S=3.00:1.087
S:O=1.00:2.94
H:C=2.12:1.00

These results correspond approximately to the formula $$C_3H_6(SO_3)_{1.087}$$

The mean molecular weight of the crude product was 268 to 288 (determined ebullioscopically in acetone) and 233 to 249 (determined cryoscopically in dimethyl sulfoxide). Attempts to isolate individual fractions by fractional precipitation or fractional crystallization did not succeed since chemical reaction always occurred modifying, inter alia, the solubility of the isolated fractions.

In the determination of the molecular weight of the crude product, dissociations yielding H+ ions and the formation of smaller molecules must be taken into consideration and, therefore, it can be assumed that some of the constituents of the crude product have a molecular weight above 288 (solutions of the crude product in acetone and in dimethylsulfoxide show acid reaction).

(B) *Reaction with water to β-hydroxypropane-α-sulfonic acid (barium salt).*

A sample of the product obtained in Part A was boiled for four hours with water.

An aliquot part of the solution was titrated with 0.1 N barium hydroxide solution, the precipitated barium sulfate was filtered off, the filtrate was treated with a strongly acid ion exchanger to transform the salts into the free acids and the remaining acids were titrated again with 0.1

N barium hydroxide solution. From both titration values it was calculated that for one equivalent of acids other than sulfuric acid the solution contained 0.134 mol of sulfuric acid. Weighing of the filtered, dried and calcined barium sulfate showed a value of 0.126 mol of sulfuric acid for one equivalent of other acids formed. The equivalent weight was 114, calculated from the consumption of alkali. The barium salt solution free from sulfuric acid was evaporated to dryness, the salt obtained was dried under reduced pressure at 100° C. and an infrared absorption spectrum of the salt was taken. The spectrum was compared with spectra of pure barium-1-hydroxypropane - 2-sulfonate, barium-2-hydroxypropane-1-sulfonate, barium-3-hydroxypropane-1-sulfonate and barium propene-sulfonate (cf. Schmitz, Heinz et al., Zeitschrift fur angewandte Chemie 75 (1963) No. 6, page 299). A quantitative comparison of the spectra revealed that the salt obtained contained about 33% of barium propene-sulfonate and about 66% of barium-2-hydroxypropane-1-sulfonate.

An elemental analysis of a barium salt obtained in analogous manner gave the following values (average values): 18.25% C; 3.6% H; 15.75% S; 32.95% Ba; 29.45% O, corresponding to the empirical formula:

$$Ba_{0.50}S_{1.03}O_{3.85}C_{3.13}H_{7.6}$$

The ratio of Ba:S found is approximately 0.50:1 and the ratio C:S is 3.09:1.

(C) *Reaction with sodium hydroxide solution to α-propene-sulfonic acid (sodium salt).*

56.8 grams of crude product of propylene and sulfur trioxide, prepared as described in Part A were heated at 70° C. with 175 milliliters of 3 N sodium hydroxide solution for two hours while intensely stirring. There were obtained 253 grams (221 milliliters) of solution containing 22.15% by weight of sodium propene sulfonate (analysis by bromine addition), 2.19 grams equivalents of acids per liter (after treatment with cation exchanger), 0.305 gram equivalents of which were sulfuric acid.

The sodium salts obtained were transformed into the barium salts by cation exchange and subsequent neutralization with barium hydroxide. Infrared spectroscopic examination of the barium salts obtained showed that about 15–20% of the salt consisted of barium-2-hydroxypropane-1-sulfonate while the major part consisted of barium-propene sulfonate.

(D) *Reaction with methyl amine to β-methylaminopropane-α-sulfonic acid.*

50 grams of crude product from propylene and sulfur trioxide, prepared as described in Part A, having an equivalent weight of 111.2 and yielding 0.15 mol of sulfuric acid per one equivalent of sulfonic acid in the hydrolysis with water, were heated at +120° C. with about 200 grams of methylamine for one hour in an autoclave. The product thus obtained was washed out of the autoclave with water, the unreacted methylamine was distilled off and the solution obtained was analyzed. All acids present in the solution were transformed into the free acids by treatment with ion exchangers and the solution obtained was titrated potentiometrically. A second analogous titration was carried out after the removal of sulfuric acid.

The titration curves obtained showed that there had been formed:

(1) 30 milligram equivalents (15 millimols) of sulfuric acid;

(2) 130 milligram equivalents of strong acids other than sulfuric acid; and (3) 260 milligram equivalents of 2-N-methylaminopropane-1-sulfonic acid (as determined by comparison with a substance prepared in different manner and by infrared-spectral analysis).

*Example 6*

A mixing device as shown in FIGURE 4 was used. 340 liters/hour (NTP) of butene-1 were passed through conduit 24, 100 liters/hour (NTP) of nitrogen mixed with 7.2 liters/hour (NTP) of sulfur trioxide vapor were passed through conduit 20. The butene-1 had been cooled to 0 to −5° C. and the nitrogen/sulfur trioxide mixture had a temperature of +50° C. The reacting gas mixture containing about 47 mols n-butene per mol sulfur trioxide passed from the mixing device after a mixing time of less than 0.2 second into a glass tube having a length of 60 cm. and an internal diameter of 3.4 cm. and from there through a 250-milliliter two-necked flask into a cooling trap cooled to about −70° C. The residence time of the gas mixture in the tube with connected flask was about 5 seconds and the temperature two centimeters behind the outlet opening of the mixing device was +95° C.

When the experiment was terminated, the product obtained in the cooling trap was heated to room temperature and shaken with water whereby two layers formed. The upper layer was miscible with benzene and insoluble in water. The water-soluble layer was boiled for four hours. After that time 0.20 mol of sulfuric acid had formed in the hydrolysate per mol of sulfonic acid in the product.

We claim:

1. A process which comprises intimately mixing a monoolefin of the formula

in which $R_1$, $R_2$, $R_3$ and $R_4$ stand for members selected from the group consisting of hydrogen and hydrocarbon radicals, with predominantly monomolecular sulfur trioxide in an amount such that the molar concentration of $SO_3$ in the resulting reaction mixture is at most 10%, and maintaining said reaction mixture in a reaction zone thereby forming an anhydride of a β-hydroxy-alkane-α-sulfonic acid.

2. The process of claim 1 wherein the olefin and the sulfur trioxide are mixed in less than 0.2 second.

3. A process as claimed in claim 1 wherein the molar concentration of sulfur trioxide in the reaction mixture is in the range of 3.3 to 0.5%.

4. A process as defined in claim 1 which comprises reacting a lower monoolefin with sulfur trioxide in the gaseous phase at a temperature above 50° C. under a pressure of 4 to 10 atmospheres gauge.

5. The process of claim 1 wherein the olefin is ethylene and the residence time after mixing ethylene and sulfur trioxide is at least 5 seconds.

6. The process of claim 1 wherein the olefin has at least 3 carbon atoms and the residence time after mixing said olefin and sulfur trioxide is at least 1 second.

7. A process as claimed in claim 1 which comprises carrying out the reaction in the presence of a reaction-inert diluent.

8. A process which comprises intimately mixing gaseous ethylene with monomolecular gaseous sulfur trioxide in such an amount that one mol $SO_3$ is present per 9 to 200 mols of ethylene, the residence time being 20 seconds to 10 minutes and the reaction temperature ranging from 80 to 200° C.

9. A process as defined in claim 1 wherein the anhydride is hydrolized to the corresponding acid with 0.5 to 3 times the amount by weight of water at a temperature near the boiling point of water.

10. A process as defined in claim wherein the anhydride is transformed directly into the alkali salt of the corresponding α,β-unsaturated sulfonic acid by treatment with aqueous alkali hydroxide.

(References on following page)

References Cited by the Examiner

UNITED STATES PATENTS

| | | | |
|---|---|---|---|
| 2,171,166 | 8/1939 | Seel | 260—545 X |
| 2,810,746 | 10/1957 | Rueggeberg et al. | 260—513 |
| 3,158,639 | 11/1964 | Klass et al. | 260—327 X |
| 3,163,656 | 12/1964 | Anderson et al. | 260—327 |
| 3,164,609 | 1/1965 | Voss et al. | 260—327 |

OTHER REFERENCES

Bordwell et al., J. Am. Chem. Soc., vol. 76, pp. 3945–3961 (1954).

LORRAINE A. WEINBERGER, *Primary Examiner.*

B. EISEN, *Assistant Examiner.*